US 8,838,727 B2

(12) United States Patent
Astle et al.

(10) Patent No.: US 8,838,727 B2
(45) Date of Patent: *Sep. 16, 2014

(54) MAINTAINING REFERENTIAL INTEGRITY

(75) Inventors: Troy Andrew Astle, Stanmore (AU); David de Vos, Melrose Park (AU); Samuel Joseph Tannous, Penshurst (AU)

(73) Assignee: International Business Machines Corporation, Armonk, NY (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/550,879

(22) Filed: Jul. 17, 2012

(65) Prior Publication Data
US 2013/0007051 A1    Jan. 3, 2013

Related U.S. Application Data

(63) Continuation of application No. 13/174,603, filed on Jun. 30, 2011, now Pat. No. 8,423,624.

(51) Int. Cl.
*G06F 15/16* (2006.01)
*G06F 15/167* (2006.01)

(52) U.S. Cl.
USPC ............................ 709/214; 709/215; 709/219

(58) Field of Classification Search
CPC .............. G06F 3/067; G06F 17/30067; G06F 17/30079; G06F 17/30221; H04L 67/06; H04L 67/1095; H04L 67/1097
USPC ......... 709/217, 219, 226, 203, 214, 215, 223; 707/102, 204, 634, 741; 719/328
See application file for complete search history.

(56) References Cited

U.S. PATENT DOCUMENTS

| 6,058,423 | A | 5/2000 | Factor | |
|---|---|---|---|---|
| 6,804,719 | B1* | 10/2004 | Cabrera et al. | 709/226 |
| 6,886,014 | B1 | 4/2005 | Dasgupta | |
| 6,976,060 | B2* | 12/2005 | Manczak et al. | 709/219 |
| 7,340,492 | B2* | 3/2008 | Cabrera et al. | 709/226 |
| 7,392,303 | B2 | 6/2008 | Smith et al. | |
| 7,496,611 | B2 | 2/2009 | Rasmussen et al. | |
| 7,634,491 | B2* | 12/2009 | Cabrera et al. | 709/217 |
| 7,882,110 | B2* | 2/2011 | Bahr | 707/741 |
| 8,250,211 | B2 | 8/2012 | Swildens et al. | |
| 2005/0027735 | A1* | 2/2005 | Cabrera et al. | 707/102 |
| 2007/0112890 | A1* | 5/2007 | Murase | 707/204 |
| 2010/0245938 | A1 | 9/2010 | Coley et al. | |
| 2011/0239231 | A1* | 9/2011 | Brown et al. | 719/328 |
| 2012/0066179 | A1* | 3/2012 | Saika | 707/634 |

* cited by examiner

*Primary Examiner* — Quang N Nguyen
(74) *Attorney, Agent, or Firm* — Holland & Knight LLP; Brian J. Colandreo, Esq.; Jeffrey T. Placker, Esq.

(57) ABSTRACT

A method, computer program product, and system for maintaining referential integrity is described. A method may comprise migrating a migration document in a migration shard from a first location to a second location. The method may further comprise adding a first location identifier associated with the first location of the migration document to metadata associated with the migration shard. The method may also comprise adding a second location identifier associated with the second location of the migration document to the metadata associated with the migration shard. The method may additionally comprise adding one or more shard identifiers to the metadata associated with the migration shard, each of the one or more shard identifiers corresponding to a shard that includes a document that may be referenced by one or more documents in the migration shard.

10 Claims, 7 Drawing Sheets

MAINTAINING REFERENTIAL INTEGRITY

RELATED APPLICATIONS

The subject application is a continuation application of U.S. patent application with Ser. No. 13/174,603, filed on Jun. 30, 2011, now U.S. Pat. No. 8,423,624, issued on Mar. 27, 2013, the entire content of which is herein incorporated by reference.

BACKGROUND OF THE INVENTION

A migration may involve transferring large numbers of documents (e.g., thousands of documents) from one system or location to another. For example, a website migration may include moving thousands of documents from one delivery platform to another. Further, while moving the documents, maintaining referential integrity, or ensuring that references between the documents are functional and valid, may be challenging. For example, in a website migration, ensuring that each hyperlink to another document (e.g., webpage) is functional and targets a valid document uniform resource locator (URL) maybe challenging because it may be necessary to locate all documents targeting old URL's and to update them to target new URL's.

BRIEF SUMMARY OF THE INVENTION

In an embodiment, a method may include migrating, via one or more computing devices, a migration document in a migration shard from a first location to a second location. The method may further include adding, via the one or more computing devices, a first location identifier associated with the first location of the migration document to metadata associated with the migration shard. The method may also include adding, via the one or more computing devices, a second location identifier associated with the second location of the migration document to the metadata associated with the migration shard. The method may additionally include adding, via the one or more computing devices, one or more shard identifiers to the metadata associated with the migration shard, each of the one or more shard identifiers corresponding to a shard that includes a document that may be referenced by one or more documents in the migration shard.

One or more of the following features may be included. At least one of the migration document and the document that references the migration document may be a webpage associated with a website. The first location identifier may be a first uniform resource locater identifying the migration document at the first location. The second location identifier may be a second uniform resource locater identifying the migration document at the second location. The first location may be associated with a first web content management system. The second location may be associated with a second web content management system. The migration shard may include a plurality of documents being migrated from a first web content management system to a second web content management system.

In an embodiment, a method may include querying, via one or more computing devices, metadata associated with one or more migrated shards to determine which of the one or more migrated shards include one or more documents that reference at least one document in a migration shard. The method may further include querying, via the one or more computing devices, metadata associated with each document in each of the one or more migrated shards that includes the one or more documents that reference the at least one document in the migration shard to determine which of the one or more documents of the one or more migrated shards reference the at least one document in the migration shard. The method may also include searching, via the one or more computing devices, each of the one or more documents, of the one or more migrated shards, that reference the at least one document in the migration shard for at least one first location identifier associated with a first location of the at least one document in the migration shard. The method may additionally include replacing, via the one or more computing devices, the at least one first location identifier associated with the first location of the at least one document in the migration shard with a second location identifier associated with a second location of the at least one document in the migration shard.

One or more of the following features may be included. The method may include querying metadata associated with the migration shard to determine if the migration shard includes one or more documents that reference at least one other document in the migration shard. The method may further include querying metadata associated with each document in the migration shard that references the at least one other document in the migration shard to determine which of the one or more documents of the migration shard references the at least one document in the migration shard. The method may also include searching each of the one or more documents, of the migration shard, that reference the at least one document in the migration shard for at least one first location identifier associated with the first location of the at least one document in the migration shard. The method may additionally include replacing the at least one first location identifier associated with the first location of the at least one document in the migration shard with a second location identifier associated with the second location of the at least one document in the migration shard.

In an implementation, at least one of the migration document and the document that references the migration document may be a webpage associated with a website. The first location identifier may be a first uniform resource locater identifying the migration document at the first location. The second location identifier may be a second uniform resource locater identifying the migration document at the second location. The first location may be associated with a first web content management system. The second location may be associated with a second web content management system.

In an embodiment, a computer program product may reside on a computer readable storage medium and may have a plurality of instructions stored on it. When executed by a processor, the instructions may cause the processor to perform operations which may include migrating a migration document in a migration shard from a first location to a second location. The operations may further include adding a first location identifier associated with the first location of the migration document to metadata associated with the migration shard. The operations may also include adding a second location identifier associated with the second location of the migration document to the metadata associated with the migration shard. The operations may additionally include adding one or more shard identifiers to the metadata associated with the migration shard, each of the one or more shard identifiers corresponding to a shard that includes a document that may be referenced by one or more documents in the migration shard.

One or more of the following features may be included. At least one of the migration document and the document that references the migration document may be a webpage associated with a website. The first location identifier may be a first uniform resource locater identifying the migration document at the first location. The second location identifier may be a second uniform resource locater identifying the migration document at the second location. The first location may be associated with a first web content management system. The second location may be associated with a second web content management system. The migration shard may include a plurality of documents being migrated from a first web content management system to a second web content management system.

In an embodiment, a computer program product may reside on a computer readable storage medium and may have a plurality of instructions stored on it. When executed by a processor, the instructions may cause the processor to perform operations which may include querying metadata associated with one or more migrated shards to determine which of the one or more migrated shards include one or more documents that reference at least one document in a migration shard. The operations may further include querying metadata associated with each document in each of the one or more migrated shards that includes the one or more documents that reference the at least one document in the migration shard to determine which of the one or more documents of the one or more migrated shards reference the at least one document in the migration shard. The operations may also include searching each of the one or more documents, of the one or more migrated shards, that reference the at least one document in the migration shard for at least one first location identifier associated with a first location of the at least one document in the migration shard. The operations may additionally include replacing the at least one first location identifier associated with the first location of the at least one document in the migration shard with a second location identifier associated with a second location of the at least one document in the migration shard.

One or more of the following features may be included. The operations may include querying metadata associated with the migration shard to determine if the migration shard includes one or more documents that reference at least one other document in the migration shard. The operations may further include querying metadata associated with each document in the migration shard that references the at least one other document in the migration shard to determine which of the one or more documents of the migration shard references the at least one document in the migration shard. The operations may also include searching each of the one or more documents, of the migration shard, that reference the at least one document in the migration shard for at least one first location identifier associated with the first location of the at least one document in the migration shard. The operations may additionally include replacing the at least one first location identifier associated with the first location of the at least one document in the migration shard with a second location identifier associated with the second location of the at least one document in the migration shard.

In an implementation, at least one of the migration document and the document that references by the migration document may be a webpage associated with a website. The first location identifier may be a first uniform resource locater identifying the migration document at the first location. The second location identifier may be a second uniform resource locater identifying the migration document at the second location. The first location may be associated with a first web content management system. The second location may be associated with a second web content management system.

In an embodiment, a computing system is provided. The computing system may include at least one processor and at least one memory architecture coupled with the at least one processor. The computing system may also include a first software module executable by the at least one processor and the at least one memory architecture, wherein the first software module may be configured to migrate a migration document in a migration shard from a first location to a second location. Further, the computing system may include a second software module which may be configured to add a first location identifier associated with the first location of the migration document to metadata associated with the migration shard. Additionally, the computing system may include a third software module which may be configured to add a second location identifier associated with the second location of the migration document to the metadata associated with the migration shard. Also, the computing system may include a fourth software module which may be configured to add one or more shard identifiers to the metadata associated with the migration shard, each of the one or more shard identifiers corresponding to a shard that includes a document that may be referenced by one or more documents in the migration shard.

One or more of the following features may be included. At least one of the migration document and the document that references the migration document may be a webpage associated with a website. The first location identifier may be a first uniform resource locater identifying the migration document at the first location. The second location identifier may be a second uniform resource locater identifying the migration document at the second location. The first location may be associated with a first web content management system. The second location may be associated with a second web content management system. The migration shard may include a plurality of documents being migrated from a first web content management system to a second web content management system.

The details of one or more implementations are set forth in the accompanying drawings and the description below. Other features and advantages will become apparent from the description, the drawings, and the claims.

DETAILED DESCRIPTION OF THE INVENTION

Figure 1:
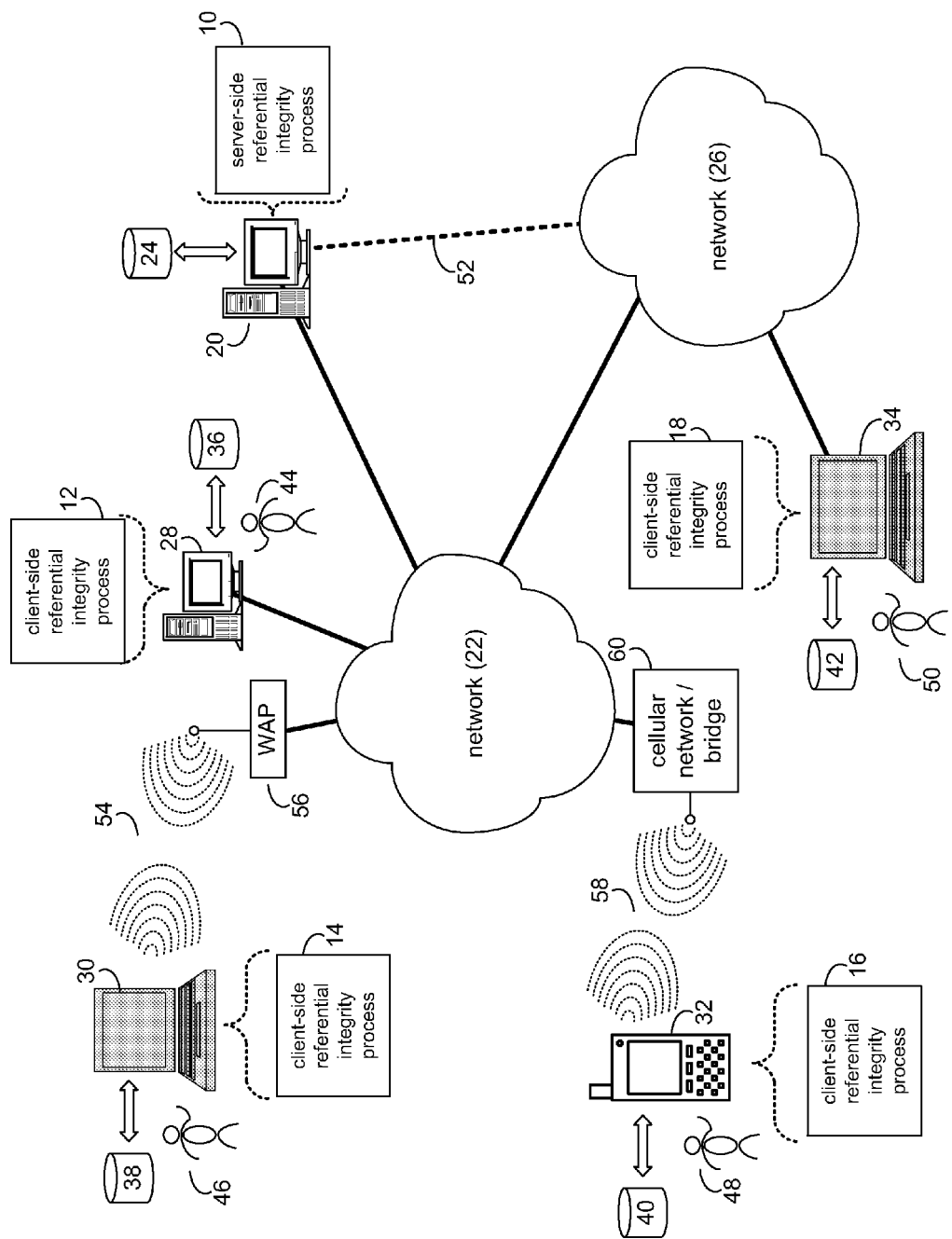
FIG. 1 is a diagrammatic view of a referential integrity process coupled to a distributed computing network.
Figure 2:
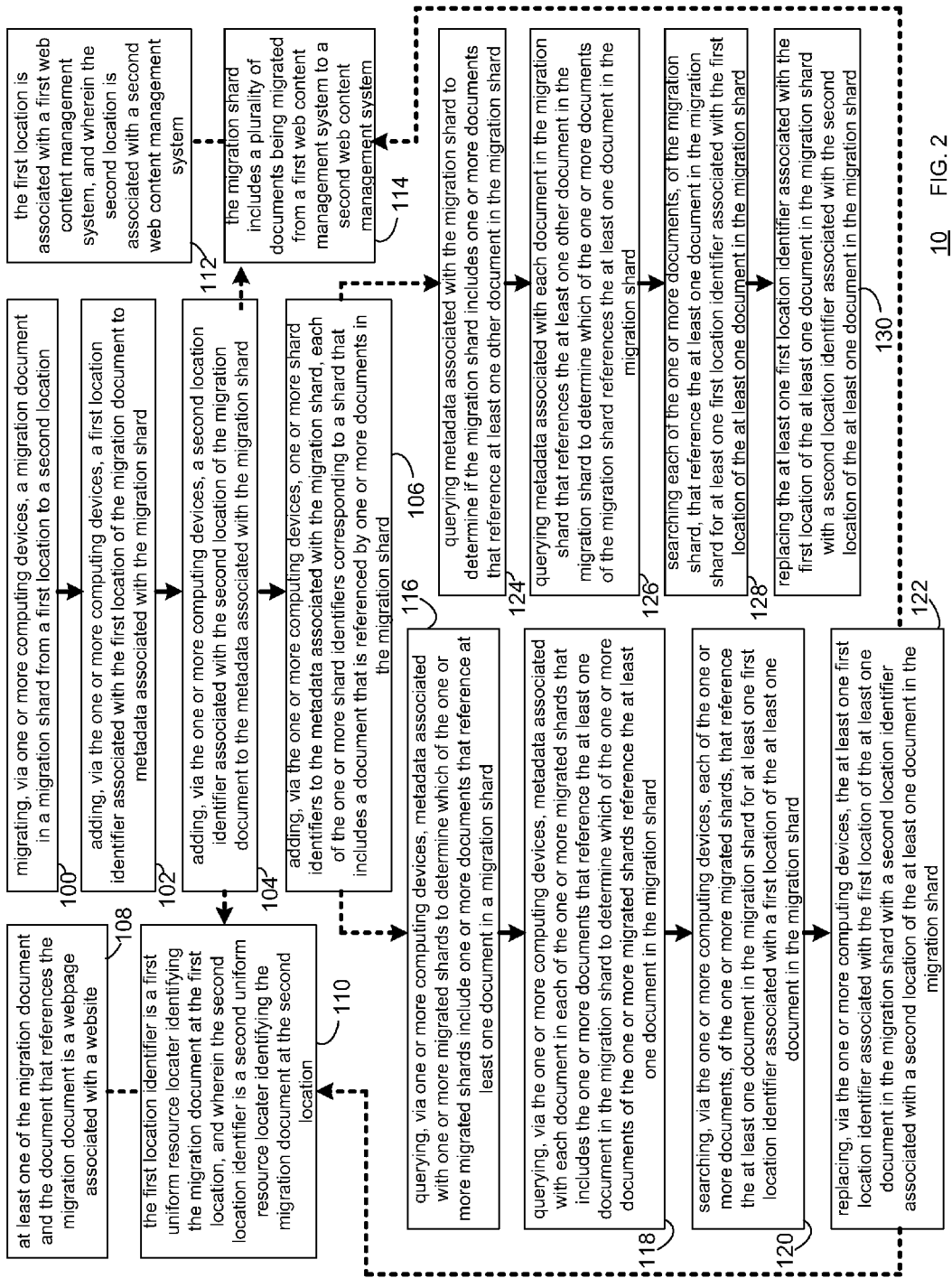
FIG. 2 is a flowchart of the referential integrity process of FIG. 1.
Figure 3:
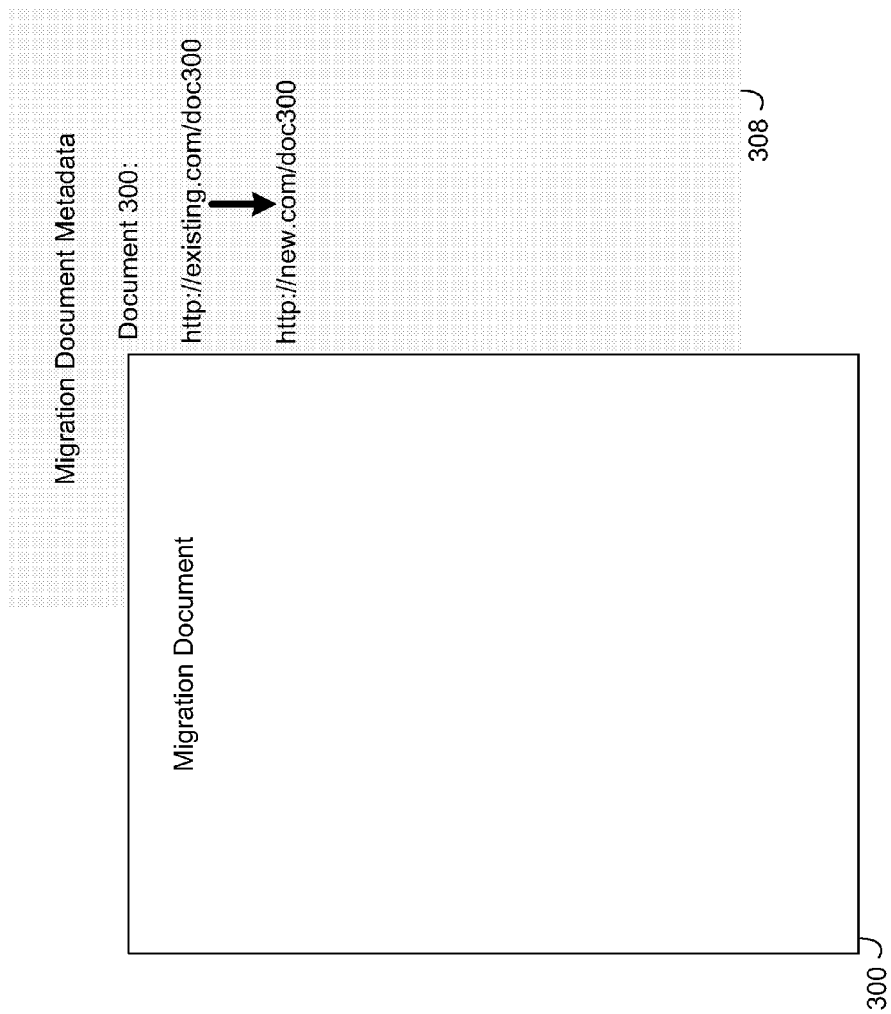
FIG. 3 is an exemplary document with associated metadata which may be associated with the referential integrity process of FIG. 1.
Figure 4:
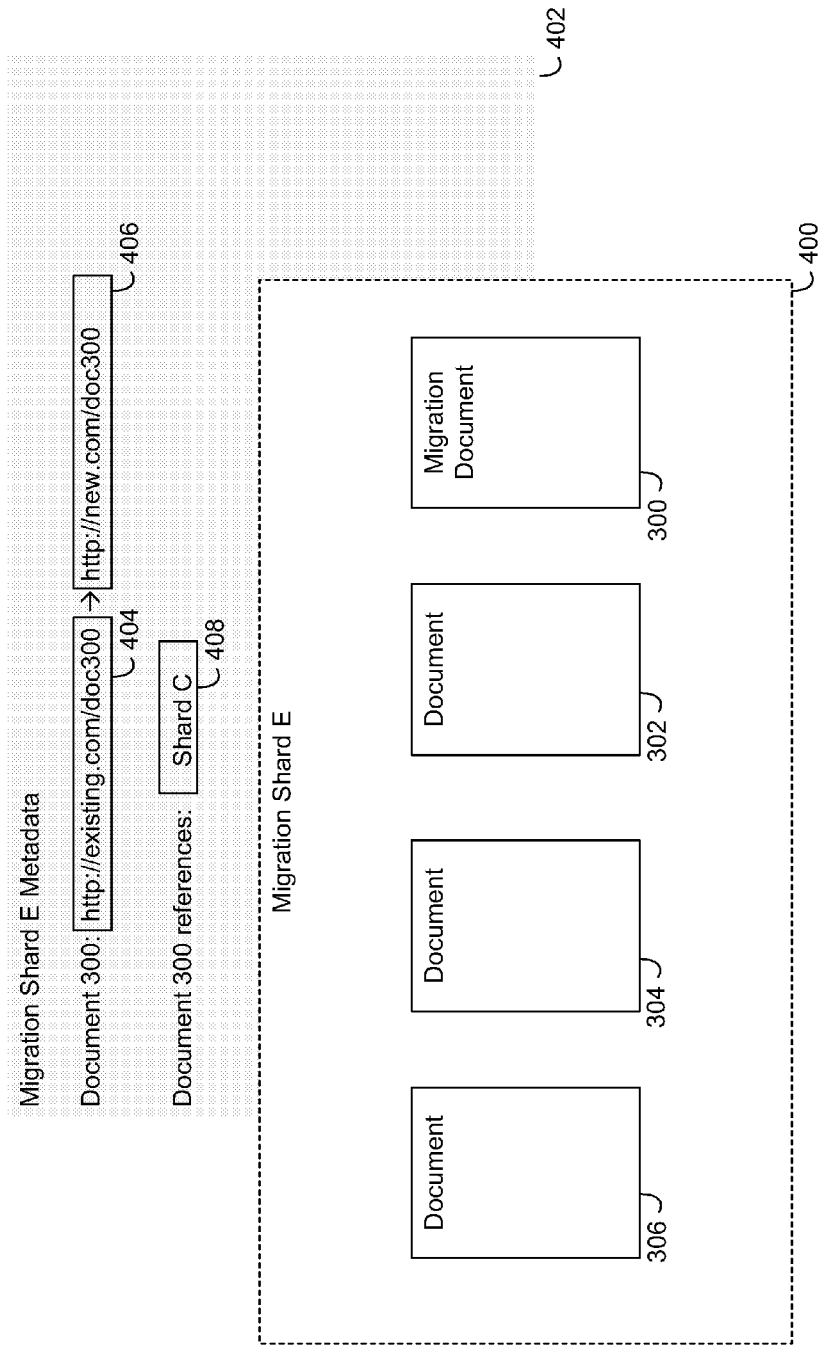
FIG. 4 is an exemplary shard with associated metadata which may be associated with the referential integrity process of FIG. 1.
Figure 5:
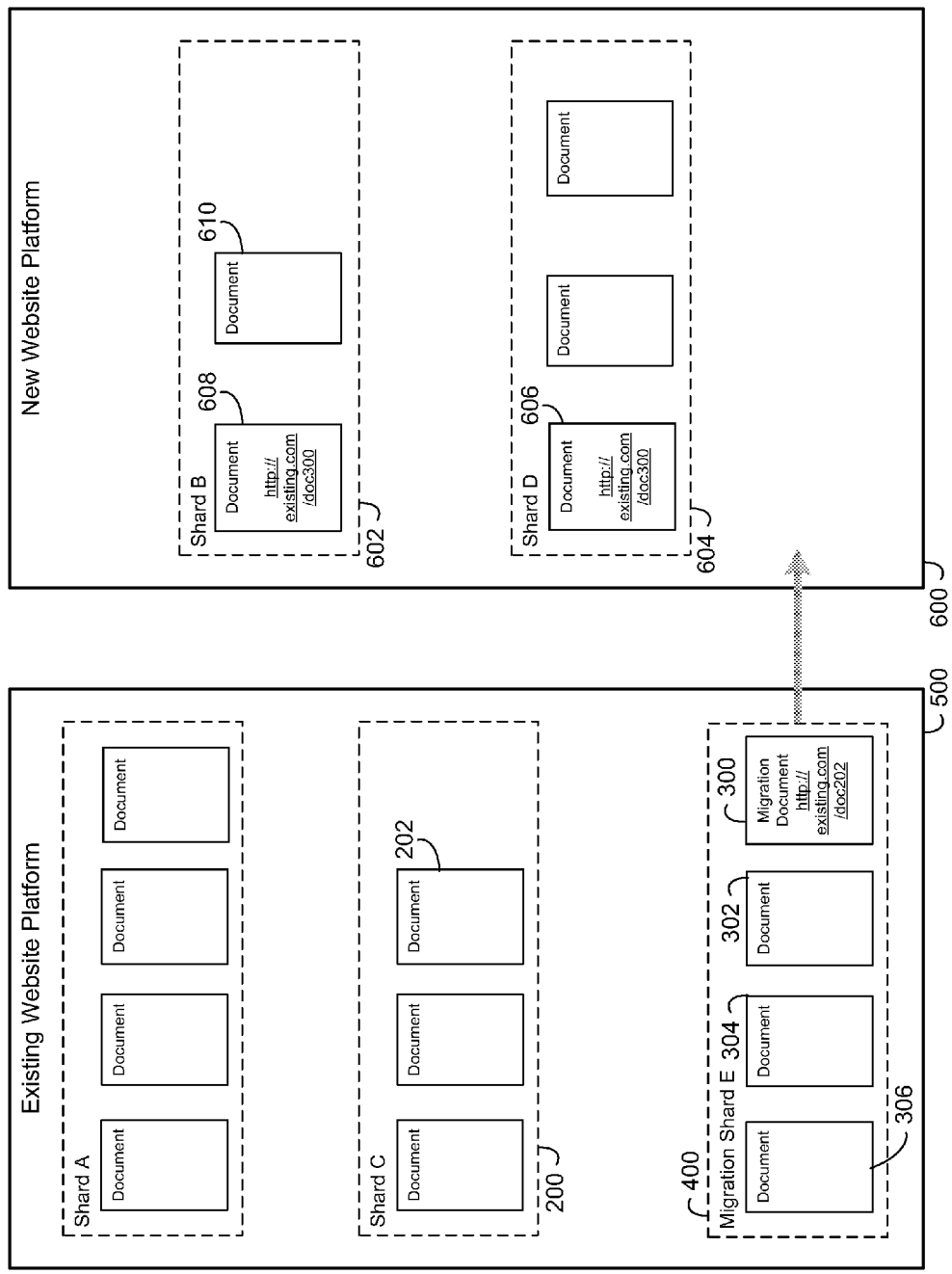
FIG. 5 is depicts an exemplary document migration which may be associated with the referential integrity process of FIG. 1.

Referring to FIGS. 1 & 2, there is shown a referential integrity process 10. As will be discussed below, referential integrity process 10 may migrate 100, a migration document in a migration shard from a first location to a second location. Referential integrity process 10 may also add 102 a first location identifier associated with the first location of the migration document to metadata associated with the migration shard. Referential integrity process 10 may also add 104 a second location identifier associated with the second location of the migration document to the metadata associated with the migration shard. Additionally, referential integrity process 10 may add 106 one or more shard identifiers to the metadata associated with the migration shard, each of the one or more shard identifiers corresponding to a shard that includes a document that references the migration document.

The referential integrity (RI) process may be a server-side process (e.g., server-side RI process 10), a client-side process (e.g., client-side RI process 12, client-side RI process 14, client-side RI process 16, or client-side RI process 18), or a hybrid server-side/client-side process (e.g., the combination of server-side RI process 10 and one or more of client-side RI processes 12, 14, 16, 18).

Server-side RI process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft Windows Server; Novell Netware; or Red Hat Linux, for example.

The instruction sets and subroutines of server-side RI process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS, Novell Web Server, or Apache Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side RI processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft Windows, Microsoft Windows CE, Red Hat Linux, or a custom operating system.

The instruction sets and subroutines of client-side RI processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side RI processes 12, 14, 16, 18 and/or server-side RI process 10 may be processes that run within (i.e., are part of) a web content management system (e.g., IBM® Web Content Manager). Alternatively, client-side RI processes 12, 14, 16, 18 and/or server-side RI process 10 may be stand-alone applications that work in conjunction with the software configuration management system and/or application. One or more of client-side RI processes 12, 14, 16, 18 and server-side RI process 10 may interface with each other (via network 22 and/or network 26).

Users 44, 46, 48, 50 may access server-side RI process 10 directly through the device on which the client-side RI process (e.g., client-side RI processes 12, 14, 16, 18) is executed, namely client electronic devices 28, 30, 32, 34, for example. Users 44, 46, 48, 50 may access server-side RI process 10 directly through network 22 and/or through secondary network 26. Further, server computer 20 (i.e., the computer that executes server-side RI process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Referential Integrity (RI) Process

For the following discussion, server-side RI process 10 will be described for illustrative purposes. It should be noted that client-side RI process 12 may interact with server-side RI process 10 and may be executed within one or more applications that allow for communication with client-side RI process 12. However, this is not intended to be a limitation of this disclosure, as other configurations are possible (e.g., stand-alone, client-side RI processes and/or stand-alone server-side RI processes.) For example, some implementations may include one or more of client-side RI processes 12, 14, 16, 18 in place of or in addition to server-side RI process 10.

Methods for maintaining referential integrity may divide large collections of documents (e.g., webpages in a website)

into smaller, more manageable collections. These smaller collections of documents may be incrementally migrated. Methods for maintaining referential integrity during document migrations may also use full-text searches of all documents (e.g., webpages in a website) to find identifiers (e.g., uniform resource locators or URL's) that reference other documents. These old identifiers (e.g., old URL's) may be replaced with new identifiers (e.g., new URL's) that target a new location (e.g., associated with a new website delivery platform or new web content management system). These full-text searches may be necessary after each document is migrated from the old location to the new location. In a migration of thousands of documents, such as large number of full-text searches may be computationally intensive, slow, and difficult to scale in even larger document migrations.

Ensuring that all document references (e.g., hyperlinks) target valid identifiers (e.g., URL's) during an incremental migration may be challenging. As each document (e.g., webpage) is migrated and its identifier (e.g., URL) is updated to reflect the new location (e.g., associated with a new website delivery platform or new web content management system), all documents (e.g., webpages) including document references (e.g., hyperlinks) targeting old identifiers (e.g., old URL's) may need to be found and updated to target new identifiers (e.g., new URL's) associated with the new location.

The smaller, more manageable collections of documents of an incremental migration may be referred to as "shards". For example, during incremental migration of a website, the documents (e.g., webpages) of the website may be split into shards, and each shard may include a number of individual documents of the website. Each shard may be a group or batch of documents that includes an arbitrary number of the website's documents, and each document may vary in size. Each document may only be included in a single shard.

Referring now to FIGS. 1-5, RI process 10 may migrate 100 a migration document (e.g., migration document 300) in a migration shard (e.g., migration shard 400) from a first location (e.g., website platform 500) to a second location (e.g., website platform 600). Migration document 300 may be an html document or any other type of document that may be part of a website and may include metadata 308 describing an old URL and a new URL. Migration shard 400 may include a predefined number of documents which may be of varying sizes and/or types. Website platform 500 may be an existing website delivery platform and/or existing web content management system, and may reside on one or more server computers associated with the existing website delivery platform and/or existing web content management system. Website platform 600 may be a new website delivery platform and/or new web content management system, and may reside on one or more server computers associated with the new website delivery platform and/or new web content management system. In an example, documents associated with website platform 500 may be migrated to website platform 600.

During the migration, RI process 10 may add 102 a first location identifier (e.g., URL 404) associated with the first location (e.g., web platform 500) of the migration document (e.g., migration document 300) to metadata associated with the migration shard (e.g., migration shard metadata 402). Further, RI process 10 may add 104 a second location identifier (e.g., URL 406) associated with the second location (e.g., web platform 600) of the migration document (e.g., migration document 300) to the metadata associated with the migration shard (e.g., migration shard metadata 402). Additionally, RI process 10 may add 106 one or more shard identifiers to the metadata associated with the migration shard (e.g., migration shard metadata 402). Each of the one or more shard identifiers may correspond to a shard (e.g., shard identifier 200) that the migration document (e.g., migration document 300) may reference.

It should be noted that each of the one or more shard identifiers (e.g., shard identifier 408) may correspond to a migrated shard (e.g., shard B and/or D) and/or an un-migrated shard (e.g., shard A and/or C) that may include a document (e.g., document 202) that the migration document (e.g., migration document 300) references. An application that calls RI process 10 may determine which shards are referenced by the migration document based upon how the shards are created in the first place. For example, the application that calls RI process 10 may use the path structure of a website to determine how the shards are split up and may therefore utilize the path of references within the migration document to determine the list of shards it references. The application that calls RI process 10 may provide the first location identifier and the second location identifier for a document, as well as the list of shards that are referenced (one or more times) by the migration document.

In an implementation, at least one of the migration document (e.g., migration document 300) and the document that references the migration document (e.g., documents 606, 608) may be (108) a webpage associated with a website. For example, migration document 300 may be a webpage with URL <http://existing.com/doc300> associated with website <http://existing.com>. Further, documents 606 and/or 608, which may have previously been located on website platform 500, may be websites with URL's <http://new.com/doc606> and <http://new.com/doc608>, respectively, and may be associated with website <http://new.com> on website platform 600. The first location identifier (e.g., URL 404) may be (110) a first uniform resource locater (e.g., URL 404) identifying the migration document (e.g., migration document 300) at the first location (e.g., website platform 500). The second location identifier (e.g., URL 406) may be (110) a second uniform resource locater (e.g., URL 406) identifying the migration document (e.g., migration document 300) at the second location (e.g., website platform 600).

Further, the first location may be associated (112) with a first web content management system (e.g., associated with website platform 500), and the second location may be associated (112) with a second web content management system (e.g., associated with website platform 600). The first and/or second web content management systems may be, for example, IBM® Web Content Manager. The migration shard (e.g., migration shard 400) may include (114) a plurality of documents (e.g., documents 300, 302, 304, 306) being migrated from a first web content management system (e.g., associated with website platform 500) to a second web content management system (e.g., associated with website platform 600).

Figure 6:
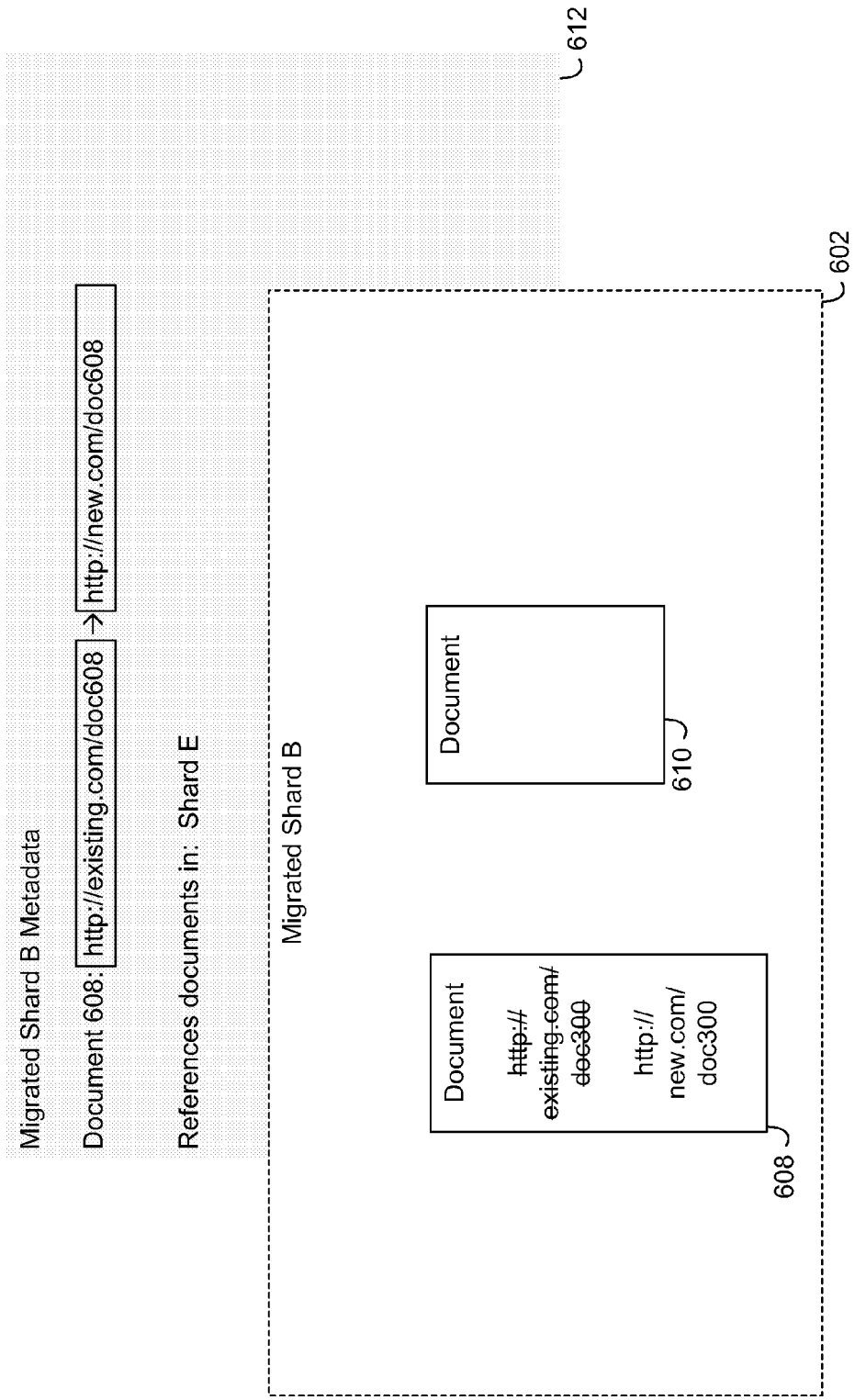
FIG. 6 is also an exemplary shard with associated metadata which may be associated with the referential integrity process of FIG. 1.

Referring now also to FIG. 6, RI process 10 may query 116 metadata (e.g., metadata 612) associated with one or more migrated shards (e.g., shard 602) to determine which of the one or more migrated shards (e.g., shards 602 or shard B, 604 or shard D) include one or more documents (e.g., document 606 of shard D and/or document 608 of shard B) that reference at least one document (e.g., document 300) in a migration shard (e.g., migration shard 400 or shard E). Shards B and D (e.g., shards 602 and 604) may have been previously migrated from existing website platform 500 to new website platform 600. Metadata (e.g., metadata 612) associated with each previously migrated shard (e.g., shard 602) may include data indicating whether documents (e.g., documents 608, 610) in the shard (e.g., shard 602) reference other documents in other shards. This data may be, for example, the text: "Reference documents in: Shard E".

Figure 7:
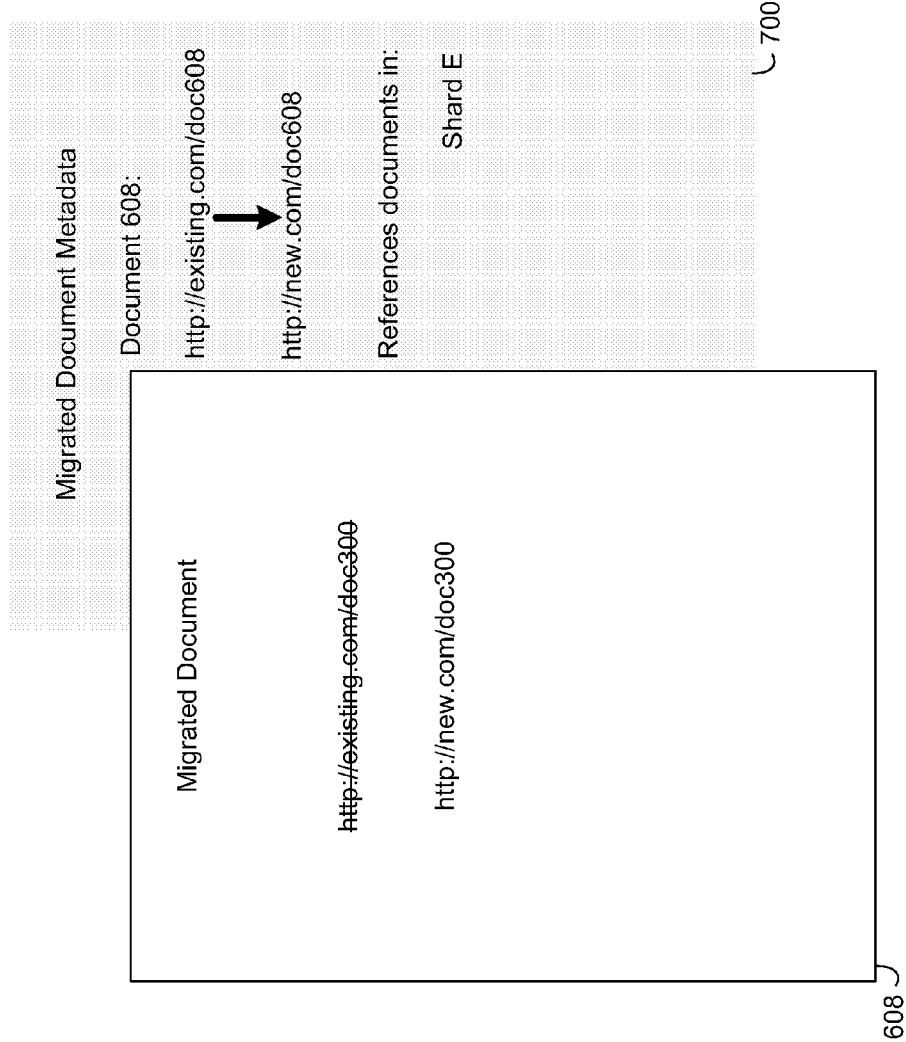
FIG. 7 is also an exemplary document with associated metadata which may be associated with the referential integrity process of FIG. 1.

Referring now also to FIG. 7, RI process 10 may query 118 metadata (e.g., metadata 700) associated with each document (e.g., documents 606, 608, 610) in each of the one or more migrated shards (e.g., shards 602, 604) that includes the one or more documents (e.g., documents 606, 608) that reference the at least one document (e.g., document 300) in the migration shard (e.g., shard 400) to determine which of the one or more documents (e.g., documents 606, 608) of the one or more migrated shards (e.g., shards 602, 604) reference the at least one document (e.g., document 300) in the migration shard (e.g., shard 400). Further, RI process 10 may search 120 each of the one or more documents (e.g., documents 606, 608) of the one or more migrated shards (e.g., shards 602, 604), that reference the at least one document in the migration shard (e.g., document 300) for at least one first location identifier (e.g., URL <http://existing.com/doc300> as shown in FIGS. 6 & 7) associated with a first location (e.g., exiting website platform 500) of the at least one document (e.g., document 300) in the migration shard (e.g., migration shard 400). RI process 10 may replace 122 the at least one first location identifier (e.g., URL <http://existing.com/doc300> as shown in FIGS. 6 & 7) associated with the first location (e.g., exiting website platform 500) of the at least one document (e.g., document 300) in the migration shard (e.g., migration shard 400) with a second location identifier (e.g., URL <http://new.com/doc300> as shown in FIGS. 6 & 7) associated with a second location (e.g., new website platform 600) of the at least one document (e.g., document 300) in the migration shard (e.g., migration shard 400).

For example, and as shown FIG. 6, document 608 in previously migrated shard 602 (e.g., shard B) may reference document 300 in migration shard 400. Document 300 in migration shard 400 may have been identified at existing website platform 500 with the URL <http://existing.com/doc300>. After document 300 is migrated to new website platform 600, document 300 may from then on be identified at new website platform 600 with the URL <http://new.com/doc300>. In order for already migrated document 608 to include a valid reference to document 300 in migration shard 400 after document 300 has been migrated, document 608 will need to include a hyperlink to <http://new.com/doc300> instead of <http://new.com/doc300>. Since there may be many instances of documents in previously migrated shards referencing old URL's for documents that are currently being migrated to new website platform 600, the ability to search shard level metadata (e.g., metadata 612) of previously migrated shards (e.g., shards B, D) in order to isolate which of the previously migrated shards (e.g., shards B, D) documents which include links to documents in the currently migrating shard (e.g., shard E) may allow for searching far less documents in previously migrated shards in order to determine where the hyperlinks are that need to be replaced.

Assume for illustrative purposes that only shard B and not shard D includes a document that references another document in currently migrating shard 400. By having the ability to search shard level metadata associated with shard B and shard D, RI process 10 may learn that shard D does not include a document that references another document in shard 400, and may therefore bypass searching documents in shard D while updating each previously migrated shard to reflect the current migration of documents in shard 400. In this way, RI process 10 may allow for minimizing the amount of previously migrated documents that must be searched in order to find which of the previously migrated documents include references to currently migrating documents because multiple shards of documents may not include documents that reference the currently migrating documents, as may be learned through examining their metadata. These multiple shards then may be avoided when searching previously migrated documents in order to find which hyperlinks need to be replaced.

As each document (e.g., document 302) in the currently migrating shard (e.g., shard 400 or shard E) is migrated to new website platform 600, each of those documents may be referenced by another document (e.g., document 300, 302, 304, 306) in migration shard (e.g., shard 400 or shard E) that has already been migrated (e.g., document 300). Assume for illustrative purposes that document 302 has already been migrated to new website platform 600 and that document 302 references document 300 in existing website platform 500. As such, RI process 10 may query 124 metadata (e.g., metadata 402) associated with the migration shard (e.g., shard 400 or shard E) to determine if the migration shard (e.g., shard 400 or shard E) includes one or more documents (e.g., document 302) that reference at least one other document (e.g., document 300) in the migration shard (e.g., shard 400 or shard E). Further, RI process 10 may query 126 metadata associated with each document (e.g., document 302) in the migration shard (e.g., shard 400 or shard E) that references the at least one other document (e.g., document 300) in the migration shard (e.g., shard 400 or shard E) to determine which of the one or more documents (e.g., document 302) of the migration shard references the at least one document (e.g., document 300) in the migration shard (e.g., shard 400 or shard E).

Once RI process 10 determines that at least already migrated document 302 of shard 400 references currently migrating document 300 of shard 400, RI process 10 may search 128 each of the one or more documents (e.g., at least already migrated document 302), of the migration shard, that reference the at least one document (e.g., currently migrating document 300) in the migration shard for at least one first location identifier (e.g., URL <http://existing.com/doc300>) associated with the first location (e.g., existing website platform 500) of the at least one document (e.g., currently migrating document 300) in the migration shard (e.g., shard 400). Further, RI process 10 may replace 130 the at least one first location identifier (e.g., URL <http://existing.com/doc300>) associated with the first location (e.g., existing website platform 500) of the at least one document (e.g., currently migrating document 300) in the migration shard (e.g., shard 400) with a second location identifier (e.g., URL <http://new.com/doc300>) associated with the second location (e.g., new website platform 600) of the at least one document (e.g., currently migrating document 300) in the migration shard (e.g., shard 400). In this way, RI process 10 may maintain referential integrity for references included in documents in the currently migrating shard, as well as for references in documents included in the previously migrated shards.

Referring back to FIG. 5, in an example, shards B and D will have already been migrated to new website platform 600. Any hyperlinks in documents in shard B that reference documents in shard D, will have been updated by RI process 10 as described above. Further, any hyperlinks in documents in shard D that reference documents in shard B, will have also been updated by RI process 10 as described above. Any hyperlinks documents in shards B and D that reference documents in migration shard E, the currently migrating shard, will now be updated as described above. Assume for illustrative purposes that documents in shard B include hyperlinks to documents in shard E, but that documents in shard D do not. RI process 10, by querying metadata as described above, may be configured to determine that shard B does include documents that include hyperlinks referencing documents in shard E, but that documents in shard D do not include hyperlinks referencing documents in shard E. Therefore, RI process 10 may bypass searching documents in shard D in order to update hyperlinks as documents in shard E are migrated. Similarly, RI process 10 may be configured to update hyperlinks in shards B and D that reference documents in shards A or C, when shards A or C are migrated to new website platform 600. In this way RI process 10 may save processing capacity and memory during incremental migrations by minimizing the number of documents that need to have hyperlinks searched-out for replacement.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method comprising:
   migrating, via one or more computing devices, a migration document in a migration shard from a first location to a second location;
   adding, via the one or more computing devices, a first location identifier associated with the first location of the migration document to metadata associated with the migration shard;
   adding, via the one or more computing devices, a second location identifier associated with the second location of the migration document to the metadata associated with the migration shard; and
   adding, via the one or more computing devices, one or more shard identifiers to the metadata associated with the migration shard, each of the one or more shard identifiers corresponding to a shard that includes a document that is referenced by one or more documents in the migration shard.

2. The method of claim 1, wherein at least one of the migration document and the document that references the migration document is a webpage associated with a website.

3. The method of claim 1, wherein the first location identifier is a first uniform resource locator identifying the migration document at the first location, and wherein the second location identifier is a second uniform resource locator identifying the migration document at the second location.

4. The method of claim 1, wherein the first location is associated with a first web content management system, and wherein the second location is associated with a second web content management system.

5. The method of claim 1, wherein the migration shard includes a plurality of documents being migrated from a first web content management system to a second web content management system.

6. A method of comprising:
   querying, via one or more computing devices, metadata associated with one or more migrated shards to determine which of the one or more migrated shards include one or more documents that reference at least one document in a migration shard;
   querying, via the one or more computing devices, metadata associated with each document in each of the one or more migrated shards that includes the one or more documents that reference the at least one document in the migration shard to determine which of the one or more documents of the one or more migrated shards reference the at least one document in the migration shard;
   searching, via the one or more computing devices, each of the one or more documents, of the one or more migrated shards, that reference the at least one document in the migration shard for at least one first location identifier associated with a first location of the at least one document in the migration shard; and
   replacing, via the one or more computing devices, the at least one first location identifier associated with the first location of the at least one document in the migration shard with a second location identifier associated with a second location of the at least one document in the migration shard.

7. The method of claim 6, further comprising:
   querying metadata associated with the migration shard to determine if the migration shard includes one or more documents that reference at least one other document in the migration shard;
   querying metadata associated with each document in the migration shard that references the at least one other document in the migration shard to determine which of the one or more documents of the migration shard references the at least one document in the migration shard;
   searching each of the one or more documents, of the migration shard, that reference the at least one document in the migration shard for at least one first location identifier associated with the first location of the at least one document in the migration shard; and
   replacing the at least one first location identifier associated with the first location of the at least one document in the migration shard with a second location identifier associated with the second location of the at least one document in the migration shard.

8. The method of claim 6, wherein at least one of the at least one document in the migration shard and the one or more documents that reference the at least one document in the migration shard is a webpage associated with a website.

9. The method of claim 6, wherein the at least one first location identifier is a first uniform resource locator identifying the at least one document in the migration shard at the first location, and wherein the second location identifier is a second uniform resource locator identifying the at least one document in the migration shard at the second location.

10. The method of claim 6, wherein the first location is associated with a first web content management system, and wherein the second location is associated with a second web content management system.

* * * * *